United States Patent [19]

Láslzló et al.0[45]

[11] Patent Number: 5,046,452

Date of Patent: Sep. 10, 1991

[54] METHOD AND APPARATUS FOR BREEDING ROES OR EGGS OF AQUATIC ANIMALS

[76] Inventors: Lajos Láslzló, Sasvár u. 86., H-1163 Budapest; Miklós Bercsényi, Vöröshadsereg u. 125., H-1183 Budapest; András Nagy, Szépvölgyi u. 217, H-1025 Budapest, all of Hungary

[21] Appl. No.: 466,252

[22] PCT Filed: Jul. 3, 1989

[86] PCT No.: PCT/HU89/00034

§ 371 Date: Apr. 9, 1990

§ 102(e) Date: Apr. 9, 1990

[87] PCT Pub. No.: WO90/00004

PCT Pub. Date: Jan. 11, 1990

[30] Foreign Application Priority Data

Jul. 1, 1988 [HU] Hungary .............................. 3453/88

[51] Int. Cl.⁵ .............................................. A01K 61/00
[52] U.S. Cl. ...................................................... 119/3
[58] Field of Search ............................................ 119/3

[56] References Cited

U.S. PATENT DOCUMENTS

| 4,014,293 | 3/1977 | Salter ..................................... | 119/3 |
| 4,742,798 | 5/1988 | Blackett .................................. | 119/3 |

FOREIGN PATENT DOCUMENTS

| 909514 | 4/1954 | Fed. Rep. of Germany . | |
| 902691 | 2/1982 | U.S.S.R. ................................... | 119/3 |
| 1050618 | 10/1983 | U.S.S.R. ................................... | 119/3 |
| 1331466 | 8/1987 | U.S.S.R. . | |
| 1412687 | 7/1988 | U.S.S.R. ................................... | 119/3 |

Primary Examiner—Robert P. Swiatek
Attorney, Agent, or Firm—Young & Thompson

[57] ABSTRACT

A method for breeding roe or eggs of aquatic animals, e.g. fish, comprising maintaining the roe or eggs in an oxygen-containing gaseous environment, e.g. air, in direct contact with the gas of the oxygen-containing gaseous environment, and humidifying the gaseous environment to avoid desiccation of the roe or eggs. Thereafter, the roe or eggs are maintained partly in a mixed liquid and gaseous environment and finally immersed in an all-liquid environment. Preferably, the gaseous environment is saturated with water vapor.

4 Claims, 1 Drawing Sheet

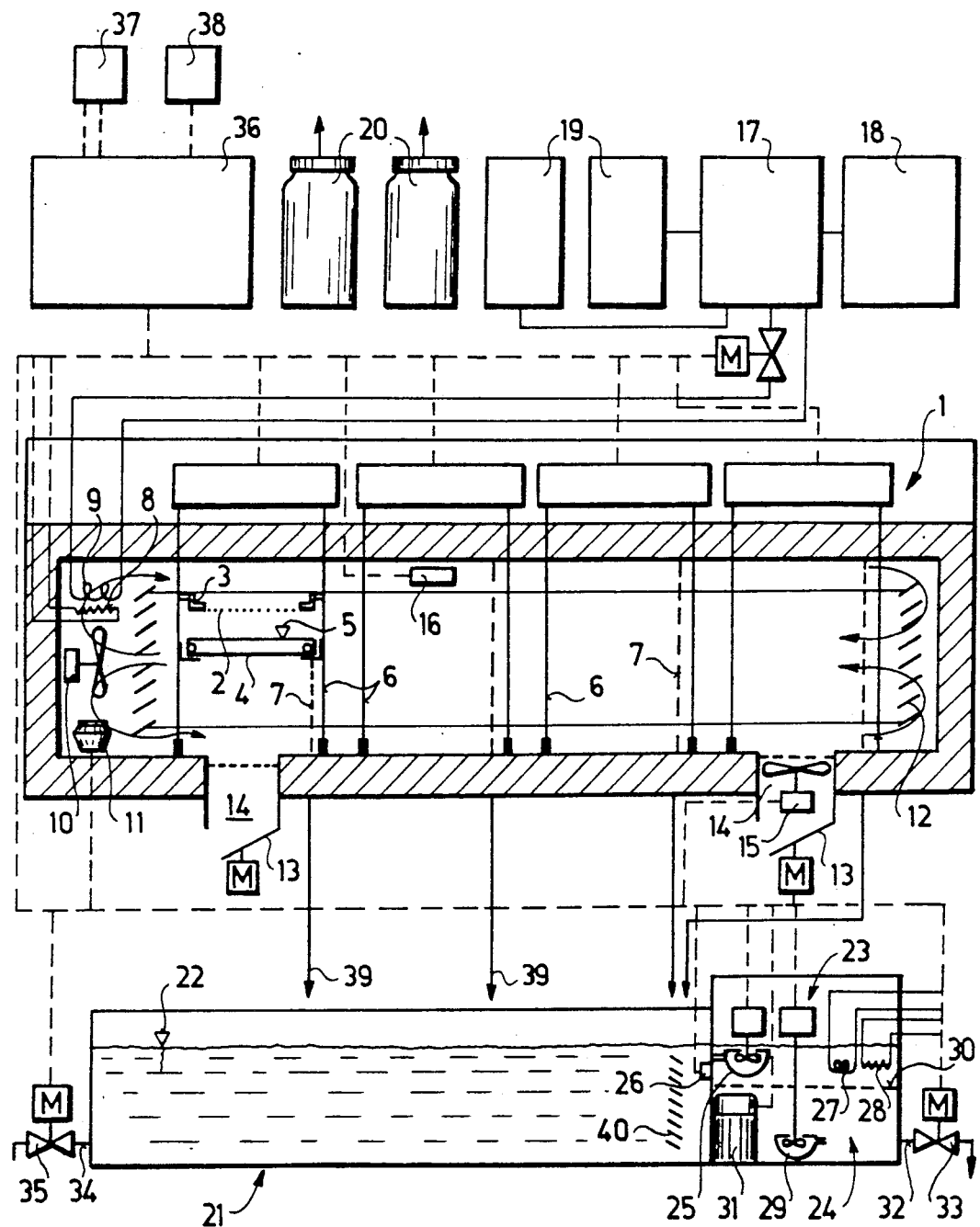

METHOD AND APPARATUS FOR BREEDING ROES OR EGGS OF AQUATIC ANIMALS

FIELD OF THE INVENTION

This invention relates to a method for breeding roes or eggs of aquatic animals wherein suitable living-space is provided for them and therein, the roes or eggs are hatched. The invention also relates to an apparatus for breeding roes or eggs of aquatic animals having a container for providing suitable living space-space for the roes or eggs.

BACKGROUND OF THE INVENTION

In the conventional industrial systems of propagation of aquatic animals, their roes or eggs are separated and special living-spaces are provided for them. In all cases, the gas exchange being necessary for the evolution of the roes or eggs is provided from the water which has to be streamed through the living-space constantly in a great amount.

However, the conventional methods and apparatuses for artificial breeding of the roes or eggs have numerous problems. As it is known, the normal evolution of the roes or eggs necessitates specially treated water which has to be streamed in great amount for providing the intensive gas exchange as required by the roes or eggs. This has its reason in the fact that not only the embryo growing in the roes or eggs has to be fed with oxygen but the carbon dioxide produced by them and the nitrogen resulting from the autolysis of the died embryos have to be removed from the water.

For reducing the water consumption, it has been suggested earlier to regenerate and recycle the water coming out of the living-space of the known solutions. It has been proven, however, that this don't make easier and cheaper the artificial breeding of roes or eggs since, for recycling, clearing and regeneration, at least so many machines, materials and energy are needed as for clearing and treating the newly introduced fresh water. Nevertheless, the conventional solution occupies a relatively big surface area and it can only be erected only in the neighborhood of an adapted water source and energy source.

All these factors mean a considerable hindrance in the way of the breeding of roes or eggs under industrial circumstances. Therefore, the breeding of roes or eggs is not solved until yet in the quality and amount as required in today's agriculture.

ESSENCE OF THE INVENTION

The main object of this invention is to eiliminate the above said deficiencies and to provide a method and an apparatus for breeding roes or eggs of aquatic animals wherein optimal circumstances can be provided for their evolution and, thus, they can be rescued to a greater extent as before for further raising. Another object of the invention is to provide a safe, reliable and automatic function also with regard to the special sensitiveness of the roes or eggs. Further to this, the construction should be simple and easy to operate.

According to the improvement of the known method in this invention, during the hatching, the roes or eggs are held in gaseous environment and a gas exchange of the roes or eggs is provided at least partly from the gaseous environment, wherein the living-space is humidified for avoiding desiccation of the roes or eggs.

According to a preferred realization of the method in this invention, the breeding is realized in a first-pre-hatching period, in a second hatching period and in a third preraising period, and in the first pre-hatching period gaseous environment, in the second hatching period liquid and gaseous environment and in a third pre-raising period liquid environment are used.

According to a further embodiment, the living-space of the first pre-hatching period and of the second hatching period is heat isolated and semi-hermetically closed against the out-world.

In this case it is also possible that the gaseous environment of the first pre-hatching period has a constant temperature and a relative moisture content of 100 percent.

According to a further preferred realization of the method in this invention, an at least partly noncontinuous gas exchange is provided between the gaseous environment of the first pre-hatching period and the out-world.

It is also preferred, when the hatched roes or eggs are separated in the second hatching period an they are forwarded by a liquid medium into the living space of the third pre-raising period.

According to a further preferred realization, the liquid medium of the third pre-raising period is held in constant streaming and larvas to be further raised are separated from it by gathering them on one side of the living-space of the third pre-raising period and by removing wastes from the other side.

According to the improvement of the apparatus in this invention, the living-space for pre-hatching and hatching the roes or eggs is provided in a heat-isolated and semi-hermetically closed thermostat chamber providing a regulated gaseous environment within the container.

In a preferred embodiment of the apparatus in this invention, at least one filter plate holding the roes or eggs and under each filter plate, a thermostat chamber containing a liquid medium are arranged within the thermostat chamber, and measurements of holes of the filter plate are smaller than the measurements of the roes or eggs but greater than that of the living larvas. Therein, the filter plates can be arranged in a frame being connected to a moving device immersing the filter plates into a liquid medium contained in the tray.

The embodiment of the invention is also preferred, wherein a ventilation device, a heat exchanger device and, preferably, a humidifier are arranged.

It is also preferred according to the invention when a basin containing a treated liquid having constant quality and serving as the living-space of the hatched larvas is provided, which is separated from other parts of the apparatus. Therein, a water treating device and a filtering device separating the larvas from the waste material are provided within the basin.

According to a further aspect of the invention, the water treating device has a heat feeler, a cooler, a heater and a circulating pump which are immersed into the liquid of the basin.

According to a further preferred embodiment, the filtering device has an electronic separating filter, a pump circulating the liquid and a mechanical filter.

It is finally preferred, when an electronic circuitry controlling processes of the living-spaces is provided.

BRIEF DESCRIPTION OF THE DRAWING

Further objects and details of the invention will be described hereinafter on the basis of preferred examples with reference to the accompanying drawing, in which:

The single FIGURE shows diagrammatically a preferred embodiment of the apparatus of this invention.

DETAILED DESCRIPTION OF THE PREFERRED EMBODIMENT

In the sense of the invention, the roes or eggs are pre-hatched and hatched in the same equipment: in a thermostat chamber 1. Therein, filter plates 2 are stretched onto a frame 3. Filter plates 2 are made of an artificial material and their holes are smaller than the measurements of the roes or eggs but greater than that of the living larvas. Under each filter plate 2, a tray 4 is arranged which contains a liquid medium 5 being necessary for the hatching period. As it is clear from the FIGURE, more than one filter plate 2 and tray 4 are arranged one below and beside the other. For this, more frame holders 6 are arranged within the thermostat chamber 1 and each has a moving device 7 shown schematically in the FIGURE for vertically displacing the filter plates 2. Relatively short movement is necessary which can be provided e.g. by an endless chain guided by pulleys round and round and the filter plates 2 can be connected to members of the chain.

In the inside of the thermostat chamber 1, an artificial climate is provided, separately for the pre-hatching period and for the hatching period of the roes or eggs. For this, a heating coil 8, a cooling coil 9 and nearby to them, a ventilator 10 circulating the air in the thermostat chamber 1 as well as appliances for letting liquid onto and leading it away from the trays 4 are provided in the inside of thermostat chamber 1.

In sense of the invention, the living-space within the thermostat chamber 1 is humidified for avoiding the desiccation of the roes or eggs. Therefore, a humidifier 11 is also arranged in the thermostat chamber 1. It is important to provide a uniform dispersion of the gaseous medium in the thermostat chamber 1, thus, guide blades 12 are arranged on suitable places within the thermostat chamber 1. These features are shown in the FIGURE in a quite schematic form since their arrangement, forms and measurements will vary always according to the requirements of the aquatic animals to be bred.

The gaseous medium within the thermostat chamber 1 is to be refreshed at least periodically. The thermostat chamber 1 is therefore semi-hermetic and it has openings 14 which can be closed by non-return valves 13. In one of the openings 14, a ventilator 15 is provided for blowing air into thermostat chamber 1. In this way, the living-spaced within thermostat chamber 1 is fed with fresh air in a regulated way. The climate within thermostat chamber 1 is controlled by sensors 16 which are for example sensors of temperature, humidity etc.

The thermostat chamber 1 is equipped with auxiliary devices. To cooling coil 9, a heat exchanger 17 is attached, onto which a cooling aggregate 18 as well as, in given case, more than one water heaters 19 are connected. Simultaneously, chemical agents, medicines and the like can be introduced into thermostat chamber 1. Containers 20 of these agents are to be connected into the conduits through which the liquid medium 5 is transferred onto trays 4.

In the sense of the invention, the living space of the bred larvas are separated from the other living spaces and is formed as a basin 21. In this basin 21, the larvas are pre-raised for being livable also under natural circumstances. In basin 21, a liquid medium, i.e. treated water 22 is provided in suitable quality and amount. Therefore, a water treating device 23 as well as a filtering device 24 are arranged within basin 21. The water treating device 23 has a circulating pump 25 and a heat sensor 26 for water 22. The desired temperature of water 22 can be adjusted by a cooler 27 and by a heater 28.

The bred larvas for further raising are separated from the wastes contained in the water 22 with the help of filtering device 24. For this, a pump 29 and a mechanical filter 30 are provided in water 22. It is, however, a difficult problem to separate the bred and living larvas from the dead wastes, since there isn't any significant different between their measurements. For this purpose, an electronic separating filter 31 is applied here for separating the living from the dead. One the effect of this separating filter 31, the larvas will come together quite away from separating filter 31, e.g. in the left side of the basin 21 whilst the dead waste will stream in water 22 towards a pipe-stub 32 letting out the wastes into the channel. On the left side of the basin 21, a pipe-stub 34 and a controllable valve 35 closing the pipe-stub 34 are provided and through them, the pre-raised larvas can be taken out from basin 21 with the necessary amount of water 22.

The device within thermostat chamber 1 as well as those attached to thermostat chamber 1 are operated and controlled by an electronic circuitry 36 which can be formed in the simplest manner as a microprocessor. As is shown by interrupted lines, all remote-controlled organs are connected through control lines to electronic circuitry 36 of the apparatus. There are also connected operating organs 37 and 38, through which starting parameters can be given in and the operation of the apparatus can be influenced. At the same time, the operational conditions can be displayed at e.g. operating organ 37.

A preferred realization of the method in this invention will be described in connection with the operation of the preferred embodiment of the apparatus as shown in the FIGURE.

The impregnated roes or eggs are first swelled out and made free of stickiness as usual. Thereafter, the roes or eggs are placed on filter plate 2 stretched onto frame 3 and the filter plates are arranged in the thermostat chamber 1 by connecting frames 3 of filter plates 2 to moving device 7. The trays 4 are arranged under filter plates 2 and the first phase, the pre-breeding of the roes or eggs, is started. For this, filter plates 2 with frames 3 are immersed into an antibiotic solution for short time and the desired parameters of the living-spaced of the pre-breeding will be adjusted. With heating coil 8, the air is warmed up or with cooling coil 9, it's cooled, but in cooling coil 9, warm water can alternatively be circulated. In the latter case, the warm water is derived from one of water heaters 19. On other hand, the cooled water is produced in cooling aggregate 16 with the interconnection of heat exchanger 17.

In the meanwhile, the inside of thermostat chamber 1 is aerated by opening non-return valves 13 and energizing ventilator 15. If, according to signals coming from sensors 16, the climate within thermostat chamber 1 is not satisfactory, electronic circuitry 36 switches humidifier 11 as well as heating coil 8 and/or cooling coil 9 on.

At the end of pre-breeding period, the second breeding period is started. Therein, another living-space, namely liquid medium 5 and increased temperature are needed by the roes or eggs. According to this, electronic circuitry 36 gives command to increase the inner temperature of thermostat chamber 1 as well as to stream liquid medium 5 having the same temperature onto trays 4. Thereafter, filter plates 2 with roes or eggs thereon are immersed by moving device 7 into liquid medium 5 contained in trays 4. As a result of the increased temperature and the liquid medium 5, the hatch-out end-the production of the enzyme solving the shield of the roes or eggs will start. Thereafter, the larvas get hatched in a chain reaction. During this, ventilator 10 are continuously switched on.

Near to the end of the breeding period, filter plates 2 are lifted and immersed several times and the liquid medium 5 washes through filter plates 2 as well as the hatched larvas. As is mentioned earlier, the measurements of holes of filter plates 2 are for letting the larvas through them but for retaining the wastes such as the shields of the larvas.

At the very end of the breeding period, electronic circuitry 36 opens the valves of liquid medium 5, and the liquid medium 5 washes out the living larvas from tray 4 into basin 21 as shown by arrows 39.

With this, the third pre-raising period starts for providing liveable individuals. The necessitated quality of water 22 in basin 21 is provided by water treating device 23, wherein cooler 27 and heater adjust the temperature of water 22 as mentioned above.

Despite the described construction of filter plates 2, a lot of waste material gets into basin 21. The living animals and the dead wastes have nearly the same dimensions which will be separated from each other by filtering device 24, the mechanical filter 30 of which will prevent the bigger wastes from streaming back into basin 21. The living larvas are held away from pipe-stub 40 32 letting out the wastes. When valve 33 is opened, the wastes are removed through pipe-stub 32, whilst filter louvres 40 are closed by electronic circuitry 36. The liveable small animals to be further used will be removed from basin 21 through pipe-stub 34 by opening a valve 35.

As it is proven by the experiments, surprisingly high percent of the roes or eggs gets hatched and nearly all of the liveable larvas survive the tribulations of the breeding and pre-raising. This is true despite the fact that not the specially treated water of great amount is needed in this invention, but the pre-hatching is carried out without any water and for the hatching, extremely small amount of liquid medium 5 is used only. The larvas pre-raised in basin 21 is relative liveable, thus, they need relatively small amount of water 22.

As a matter of course, the simplest realization under laboratory circumstances is only described in the above specification. When the idea of the invention is to be realized in manufacturing or industrial sizes, the machinery necessitated by this can find utilization, however, the features described in the main claims have to be taken into consideration.

We claim:

1. A method for breeding roe or eggs of aquatic animals, comprising maintaining the roe or eggs in an oxygen-containing gaseous environment in direct contact with the gas of the oxygen-containing gaseous environment, humidifying the gaseous environment to avoid desiccation of the roe or eggs.

2. A method as claimed in claim 1, and thereafter maintaining the roe or eggs partly in a mixed liquid and gaseous environment and finally immersed in an all-liquid environment.

3. A method as claimed in claim 1, in which said gaseous environment is saturated with water vapor.

4. A method as claimed in claim 1, in which said aquatic animals are fish.

* * * * *

UNITED STATES PATENT AND TRADEMARK OFFICE
CERTIFICATE OF CORRECTION

PATENT NO. : 5,046,452
DATED : September 10, 1991
INVENTOR(S) : Lajos LASZLO et al.

It is certified that error appears in the above—identified patent and that said Letters Patent is hereby corrected as shown below:

On the title page, immediately under [19], change "Láslzló et al.0[45]" to --László--. and In Item [76], change the name of the inventor to --Lajos László--.

Signed and Sealed this

Nineteenth Day of January, 1993

Attest:

DOUGLAS B. COMER

Attesting Officer

Acting Commissioner of Patents and Trademarks